United States Patent
Goya et al.

(10) Patent No.: US 9,862,055 B2
(45) Date of Patent: Jan. 9, 2018

(54) PROCESSING APPARATUS AND PROCESSING METHOD

(71) Applicant: MITSUBISHI HEAVY INDUSTRIES, LTD., Tokyo (JP)

(72) Inventors: Saneyuki Goya, Tokyo (JP); Masato Kinouchi, Tokyo (JP); Minoru Danno, Tokyo (JP); Toshiya Watanabe, Tokyo (JP); Takashi Ishide, Tokyo (JP); Tsugumaru Yamashita, Tokyo (JP); Yoshihito Fujita, Tokyo (JP); Makoto Yamasaki, Tokyo (JP); Ryu Suzuki, Tokyo (JP); Kohei Kanaoka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 150 days.

(21) Appl. No.: 14/770,015

(22) PCT Filed: Nov. 22, 2013

(86) PCT No.: PCT/JP2013/081563
§ 371 (c)(1),
(2) Date: Aug. 24, 2015

(87) PCT Pub. No.: WO2014/132504
PCT Pub. Date: Sep. 4, 2014

(65) Prior Publication Data
US 2016/0008920 A1    Jan. 14, 2016

(30) Foreign Application Priority Data
Feb. 27, 2013 (JP) .................................. 2013-038008

(51) Int. Cl.
*B23K 26/064* (2014.01)
*B23K 26/082* (2014.01)
(Continued)

(52) U.S. Cl.
CPC ........ *B23K 26/0652* (2013.01); *B23K 26/082* (2015.10); *B23K 26/36* (2013.01); *B23K 26/38* (2013.01)

(58) Field of Classification Search
CPC .......... B23K 26/0652; B23K 26/0622; B23K 26/34; B23K 26/352; B23K 2203/52; B23K 26/08; B23K 26/06; B23K 26/064
(Continued)

(56) References Cited

U.S. PATENT DOCUMENTS 4,079,230 A * 3/1978 Miyauchi ............... B23K 26/08
219/121.75
5,391,165 A * 2/1995 Fountain ............. A61F 9/00827
359/196.1
(Continued)

FOREIGN PATENT DOCUMENTS

CN   1059096 A   3/1992
CN   102189340 A   9/2011
(Continued)

OTHER PUBLICATIONS

Decision of a Patent Grant dated Dec. 6, 2016 in corresponding Japanese Patent Application No. 2013-038008 with an English machine translation.
(Continued)

*Primary Examiner* — Samuel M Heinrich
(74) *Attorney, Agent, or Firm* — Birch, Stewart, Kolasch & Birch, LLP

(57) ABSTRACT

A processing apparatus and a processing method which perform processing more accurately with a simple structure are provided. The processing apparatus includes an irradiation head 16 and a control device. The irradiation head 16 includes a laser turning unit 35 and a condensing optical system 37. The laser turning unit 35 includes a first prism 51,
(Continued)

a second prism 52, a first rotating mechanism 53, and a second rotating mechanism 54. The control device adjusts the differences between rotation speeds and phase angles of the first prism 51 and the second prism 52 based on a relation between at least a heat affected layer of a workpiece and a turning speed of laser.

8 Claims, 14 Drawing Sheets

(51) Int. Cl.
    *B23K 26/21*     (2014.01)
    *B23K 26/352*   (2014.01)
    *B23K 26/36*     (2014.01)
    *B23K 26/06*     (2014.01)
    *B23K 26/38*     (2014.01)

(58) Field of Classification Search
    USPC ............ 219/121.61–121.72, 121.83, 121.78, 219/121.81
    See application file for complete search history.

(56) References Cited

U.S. PATENT DOCUMENTS

| | | | |
|---|---|---|---|
| 5,825,740 A * | 10/1998 | Kahlman | G11B 7/0025 369/44.18 |
| 6,331,692 B1 * | 12/2001 | Krause | B23K 26/04 219/121.67 |
| 6,355,907 B1 | 3/2002 | Kuehnle et al. | |
| 6,444,948 B1 | 9/2002 | Giering et al. | |
| 7,842,901 B2 | 11/2010 | Wawers et al. | |
| 2007/0099439 A1 | 5/2007 | Van Borkulo et al. | |
| 2008/0245776 A1 | 10/2008 | Oda et al. | |
| 2012/0199565 A1 | 8/2012 | Nomaru | |
| 2015/0014889 A1 | 1/2015 | Goya et al. | |

FOREIGN PATENT DOCUMENTS

| | | |
|---|---|---|
| CN | 102218605 A | 10/2011 |
| JP | 59-19798 B2 | 5/1984 |
| JP | 2828871 B2 | 11/1998 |
| JP | 2831215 B2 | 12/1998 |
| JP | 2008-73718 A | 4/2008 |
| JP | 2009-50869 A | 3/2009 |
| JP | 2009-139692 A | 6/2009 |
| JP | 2011-25279 A | 2/2011 |
| JP | 2011-110598 A | 6/2011 |
| JP | 2011-167704 A | 9/2011 |
| JP | 2012-17231 A | 1/2012 |
| JP | 2012-161812 A | 8/2012 |
| JP | 5189684 B1 | 4/2013 |

OTHER PUBLICATIONS

Korean Office Action and English translation thereof, dated Oct. 4, 2016, for corresponding Korean Application No. 10-2015-7022930.
Taiwanese Office Action and Search Report for Taiwanese Application No. 102143583, dated Nov. 11, 2015, with an English translation.
English translation of the Written Opinion of the International Searching Authority (Form PCT/ISA/237), dated Feb. 25, 2014, for International Application No. PCT/JP2013/081563.
Chinese Office Action and Chinese Search Report, dated Mar. 4, 2016, for Chinese Application No. 201380073713.4, along with English translations.
Extended European Search Report, dated Mar. 24, 2016 for European Application No. 13876417.0.
Taiwanese Notice of Allowance, dated Jun. 24, 2016, for Taiwanese Application No. 102143583, as well as an English translation.

* cited by examiner

<SURFACE>

<REAR SURFACE>

PROCESSING APPARATUS AND PROCESSING METHOD

FIELD

The present invention relates to a processing apparatus and a processing method for performing processing to a member to be processed by irradiating it with laser.

BACKGROUND

As a processing apparatus for perform cutting and boring relative to a workpiece, there is a processing apparatus using laser (for example, refer to Patent Literatures 1 and 2). The processing apparatus described in Patent Literatures 1 and 2 performs the cutting and the boring relative to the workpiece by irradiating the workpiece with the laser. Also, Patent Literature 1 discloses a laser processing method for performing the bore processing by irradiating the workpiece with laser light having at least two kinds of wavelengths. The laser processing method includes a step for performing processing by irradiating positions along an inner circumference of the bore with first laser light having a spot diameter smaller than a diameter of the bore and a step for irradiating positions inner than the inner circumference of the bore with second laser light having a spot diameter smaller than the diameter of the bore and a wavelength longer than that of the first laser light. In the laser processing method, a part to which the processing has not been performed in a previous step is processed in a subsequent step. Also, Patent Literature 1 discloses an apparatus which combines galvanomirrors and shifts the irradiation positions of the first laser light. Patent Literature 2 discloses to have a structure in which a coil is provided in a structure body for holding a lens and a permanent magnet is provided on a base and to rotationally operate the lens by driving the coil and turn focal points.

Also, Patent Literature 3 which has been previously filed by the applicant of this application discloses a processing apparatus including a $CO_2$ laser oscillator and an excimer laser oscillator. The processing apparatus performs cutting or boring processing of a plastic member or a FRP member by using two lasers, i.e., $CO_2$ laser beam and excimer laser beam and irradiating with the $CO_2$ laser beam. Subsequently, the processing apparatus removes a carbonized layer or a heat affected layer generated on the cut surface by irradiating the cut surface and an adjacent region of the same with the excimer laser beam. The processing apparatus described in Patent Literature 3 makes the excimer laser beam have a ring-shaped cross section, inserts the $CO_2$ laser beam into a hollow part of the laser beam, and make the optical axes of the both laser beams be the same. After that, the processing apparatus transmits both laser beams in the same transmission path, guides them near the cutting unit or a boring processing unit of the plastic member or the FRP member, and separates both the laser beams near the cutting unit or a boring processing unit again.

CITATION LIST

Patent Literature

Patent Literature 1: Japanese Patent Application Laid-open No. 2011-110598
Patent Literature 2: Japanese Patent No. 2828871
Patent Literature 3: Japanese Patent No. 2831215

SUMMARY

Technical Problem

The workpiece can be appropriately processed by turning the irradiation positions of the laser as the processing apparatus described in Patent Literatures 1 and 2. Also, the workpiece can be appropriately processed by using two lasers as the processing apparatus described in Patent Literature 3. However, there has been a problem in that it is necessary for the processing apparatus described in Patent Literatures 1 to 3 to have a complex device structure in order to increase processing accuracy.

The present invention has been made in consideration of the above. A purpose of the present invention is to provide a processing apparatus and a processing method which can more accurately perform processing with a simple structure.

Solution to Problem

According to an aspect of the present invention, a processing apparatus which performs processing by irradiating a workpiece with laser includes: an irradiation head configured to irradiate the workpiece with the laser and including a laser turning unit which turns the laser relative to the workpiece and a condensing optical system which collects the laser turned by the laser turning unit; and a control device configured to control an operation of the irradiation head. The laser turning unit includes a first prism which refracts the laser, a second prism which is arranged at a position opposite to the first prism and refracts the laser output from the first prism, a first rotating mechanism which rotates the first prism, and a second rotating mechanism which rotates the second prism, and the control device controls the first and second rotating mechanisms based on a relation between at least an allowable thickness of a heat affected layer of the workpiece and a turning speed of the laser emitted to the workpiece, and adjusts a rotation speed of the first prism, a rotation speed of the second prism, and a difference in a phase angle between the first prism and the second prism.

Advantageously, in the processing apparatus, the first rotating mechanism includes a first spindle which holds the first prism and of which a part of the light path of the laser is hollow, and a first hollow motor to which the first spindle is rotatably inserted and which rotationally drives the first spindle, and the second rotating mechanism includes a second spindle which holds the second prism and of which a part of the light path of the laser is hollow, and a second hollow motor to which the second spindle is rotatably inserted and which rotationally drives the second spindle.

Advantageously, in the processing apparatus, an error of a difference between phase angles of the first and second hollow motors is equal to or less than 0.1°.

Advantageously, in the processing apparatus, the processing includes at least one of cutting processing, boring processing, welding, cladding, surface reforming processing, surface finishing, and laser lamination molding.

Advantageously, in the processing apparatus, the control device controls the allowable thickness of the heat affected layer by controlling the rotation speeds of the first and second prisms.

Advantageously, in the processing apparatus, the heat affected layer includes at least one of a remelted layer, an oxide layer, a crack, and a dross.

Advantageously, in the processing apparatus, the workpiece is formed of any one of materials, such as Inconel (registered trademark), HASTELLOY (registered trademark), stainless, ceramic, steel, carbon steel, heat resistant steel, ceramics, silicon, titanium, tungsten, resin, plastics, fiber reinforced plastics, a composite material, and Ni based heat resistant alloy.

Advantageously, in the processing apparatus, the control device controls the first and second rotating mechanisms based on a relation between at least the allowable thickness of the heat affected layer of the workpiece, the turning speed of the laser emitted to the workpiece, and a turning radius of the laser to adjust the rotation speed of the first prism, the rotation speed of the second prism, and the difference in a phase angle between the first prism and the second prism.

According to another aspect of the present invention, a processing method for performing processing by irradiating a workpiece with laser includes: outputting the laser; determining a rotation speed of a first prism, a rotation speed of a second prism, and a difference in a phase angle between the first prism and the second prism based on a relation between at least an allowable thickness of a heat affected layer of the workpiece and a turning speed of the laser irradiated to the workpiece; rotating a first and second rotating mechanisms by the determined rotation speeds and the determined difference in the phase angle; and irradiating the workpiece with the laser while turning the laser.

Advantageously, in the processing method, the processing includes at least one of cutting processing, boring processing, welding, cladding, surface reforming processing, surface finishing, and laser lamination molding.

Advantageously, in the processing method, the heat affected layer includes at least one of a remelted layer, an oxide layer, a crack, and a dross.

Advantageously, in the processing method, the determination step determines the rotation speed of the first prism, the rotation speed of the second prism, and the difference in a phase angle between the first prism and the second prism based on the relation between at least the allowable thickness of the heat affected layer of the workpiece, the turning speed of the laser emitted to the workpiece, and a turning radius of the laser.

Advantageous Effects of Invention

According to the processing apparatus and the processing method of the present invention, a turning radius of the laser emitted to the workpiece becomes variable by changing a difference between the phase angles of the first prism and the second prism. Therefore, the processing apparatus according to the present invention can have a simple structure. Also, the processing can be performed with the turning radius which is more suitable for the processing condition by controlling the difference between the phase angles of the first prism and the second prism and making the turning radius of the laser emitted to the workpiece be variable. Accordingly, a required processing quality can be satisfied, and more accurate processing can be performed at a high speed.

DESCRIPTION OF EMBODIMENTS

Embodiments of the present invention will be described in detail with reference to the drawings. The present invention is not limited to the content described in the embodiments below. Also, components to be described below include components that a person skilled in the art can easily arrive at and components substantially identical to the components in the description. In addition, the components to be described below can be appropriately combined with each other. Also, the components can be variously abbreviated, replaced, and changed without departing from the scope of the present invention.

[First Embodiment]

Figure 1:
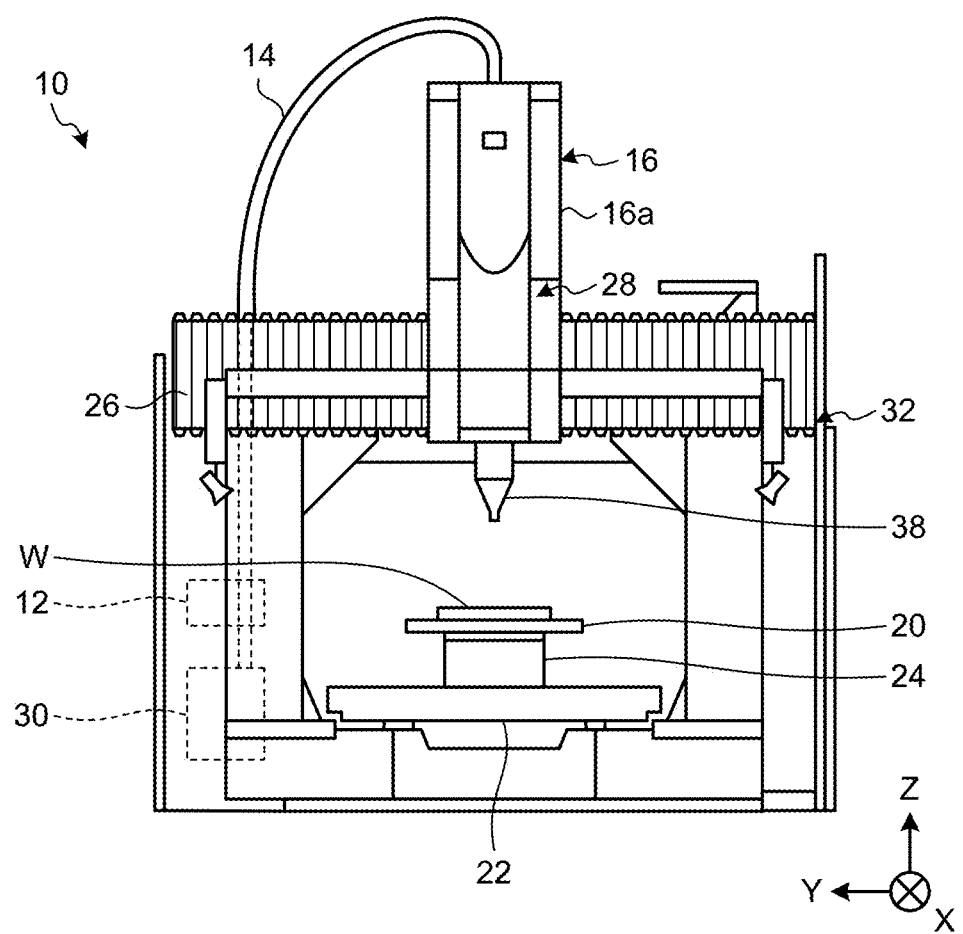
FIG. 1 is a schematic diagram of an exemplary structure of a processing apparatus according to a first embodiment.

FIG. 1 is a schematic diagram of an exemplary structure of a processing apparatus according to a first embodiment.

As illustrated in FIG. 1, a processing apparatus 10 includes a laser oscillator 12, a guiding optical system 14, an irradiation head 16, a processing stage 20, an x-axis moving mechanism 22, a c-axis rotating mechanism 24, a y-axis moving mechanism 26, a z-axis moving mechanism 28, and a control device 30. The processing apparatus 10 includes a portal bridge 32 surrounding the processing stage 20. The processing apparatus 10 irradiates a workpiece W, which is held on the processing stage 20, with the laser and performs processing to the workpiece W. Here, in the present embodiment, it is assumed that a horizontal surface of the processing stage 20 be an XY surface and a direction perpendicular to the horizontal surface of the processing stage 20 be a z-axis direction. Also, in the present embodiment, it is assumed that a rotating direction around the z-axis be a c-axis direction.

Here, the workpiece W is, for example, a plate member. As the workpiece W, a member formed of various materials can be used, for example, Inconel (registered trademark), HASTELLOY (registered trademark), stainless, ceramic, steel, carbon steel, heat resistant steel, ceramics, silicon, titanium, tungsten, resin, plastics, and Ni based heat resistant alloy. Also, as the workpiece W, a member formed of the following materials can be used, for example, fiber reinforced plastics such as carbon fiber reinforced plastics (CFRP), glass fiber reinforced plastics (GFRP), and glass-mat reinforced thermoplastics (GMT), various metals such as iron alloy other than the steel plate and aluminum alloy, and various composite materials. Also, in the present embodiment, the processing is one of cutting processing, boring processing, welding, cladding, surface reforming processing, surface finishing, laser lamination molding. Also, these processing can be combined.

The laser oscillator 12 outputs the laser and is attached with the portal bridge 32 of the processing apparatus 10. As the laser oscillator 12, for example, a fiber laser outputting device for outputting the laser by using an optical fiber as a medium or a short pulse laser outputting device for outputting short pulse laser is used. As the fiber laser outputting device, for example, a Fabry-Perot fiber laser outputting device and a ring fiber laser outputting device can be used. The laser is oscillated by exciting these outputting devices. As a fiber of the fiber laser outputting device, for example, silica glass can be used to which a rare earth element such as erbium (Er), neodymium (Nd), ytterbium (Yb), and the like is added. Regarding the short pulse laser outputting device, for example, a titanium sapphire laser can be used as an oscillation source of the laser. The pulse having a pulse width of equal to or less than 100 picosecond can be generated. Also, a laser such as a YAG laser and a YVO4 laser for generating nanosecond order pulses can be used.

The guiding optical system 14 is an optical system which guides the laser output from the laser oscillator 12 to the irradiation head 16. The guiding optical system 14 is, for example, an optical fiber in the present embodiment. One end of the guiding optical system 14 is connected to a laser emission port of the laser oscillator 12, and another end is connected to a laser incidence end of the irradiation head 16. The guiding optical system 14 guides the laser from the laser emission port of the laser oscillator 12 to the incidence end of the irradiation head 16.

The irradiation head 16 irradiates the workpiece W with the laser while rotating the laser guided by the guiding optical system 14. Also, the irradiation head 16 refracts the laser by a prism so as to offset a light path of the laser before refraction and a light path of the laser to be emitted to the workpiece W. In addition, the irradiation head 16 collects the laser and irradiates the workpiece W with the laser. Also, the irradiation head 16 is covered with an irradiation head cover 16a. The structure of the irradiation head 16 will be described below.

The processing stage 20 is a mechanism for holding the workpiece W placed on its surface. The surface of the processing stage 20 for holding the workpiece W thereon is a horizontal surface (XY surface) relative to a reference surface (for example, a surface on which the processing apparatus 10 is placed).

The x-axis moving mechanism 22 is an x-axis stage for supporting the processing stage 20, and the x-axis moving mechanism 22 moves the workpiece W to a predetermined position in the x-axis direction by moving the processing stage 20 in the x-axis direction.

The c-axis rotating mechanism 24 is arranged between the x-axis moving mechanism 22 and the processing stage 20. That is, the c-axis rotating mechanism 24 is supported by the x-axis moving mechanism 22 and supports the processing stage 20. The c-axis rotating mechanism 24 rotates the workpiece W to a predetermined position in the c-axis direction by rotationally driving the processing stage 20 in the c-axis direction.

The y-axis moving mechanism 26 supports the z-axis moving mechanism 28 and moves the irradiation head 16 in a y-axis direction. Accordingly, the y-axis moving mechanism 26 moves the irradiation head 16 to a predetermined position in the y-axis direction.

The z-axis moving mechanism 28 supports the irradiation head 16 and moves the irradiation head 16 to a predetermined position in the z-axis direction.

The processing apparatus 10 moves a relative position relationship between the workpiece W and the laser in four-axis directions by relatively moving the processing stage 20 and the irradiation head 16 in the four-axis directions, i.e., the x-axis direction, the y-axis direction, the z-axis direction, and the c-axis direction by using the x-axis moving mechanism 22, the c-axis rotating mechanism 24, the y-axis moving mechanism 26, and the z-axis moving mechanism 28.

The control device 30 is connected to the laser oscillator 12, the irradiation head 16, the x-axis moving mechanism 22, the c-axis rotating mechanism 24, the y-axis moving mechanism 26, and the z-axis moving mechanism 28 and controls the operation of each unit. For example, the control device 30 adjusts various conditions of the laser output from the laser oscillator 12 and adjusts the position of the irradiation head 16 relative to the workpiece W by moving the irradiation head 16 and the processing stage 20 by the x-axis moving mechanism 22, the c-axis rotating mechanism 24, the y-axis moving mechanism 26, and the z-axis moving mechanism 28. Also, the control device 30 detects and sets an allowable thickness of the heat affected layer based on the condition of the workpiece W (material, thickness, and the like) and the condition of the processing and controls a turning speed and a turning radius R, which are to be described, of the laser to be emitted from the irradiation head 16 to the workpiece W.

Figure 2:
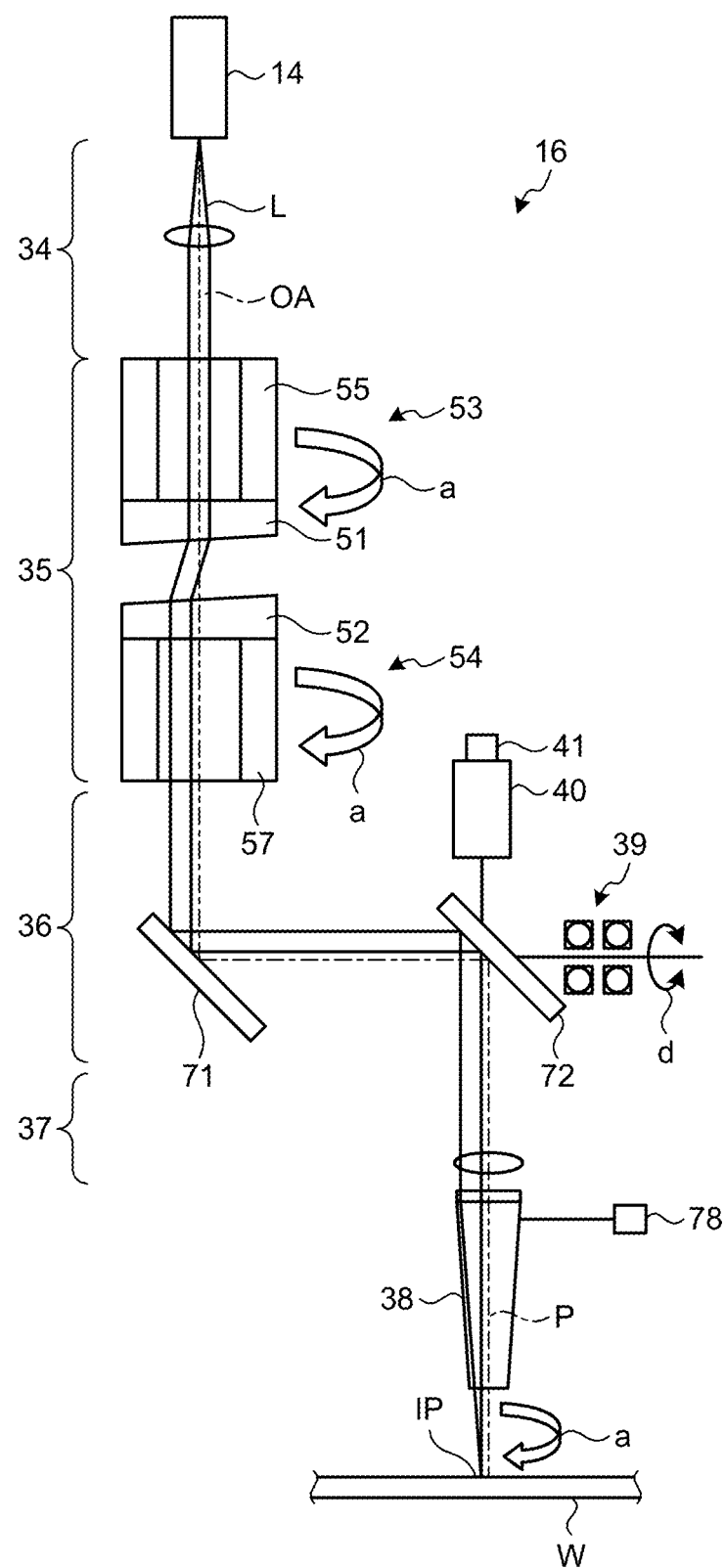
FIG. 2 is an explanatory diagram of a schematic structure of an irradiation head according to the first embodiment.
Figure 3:
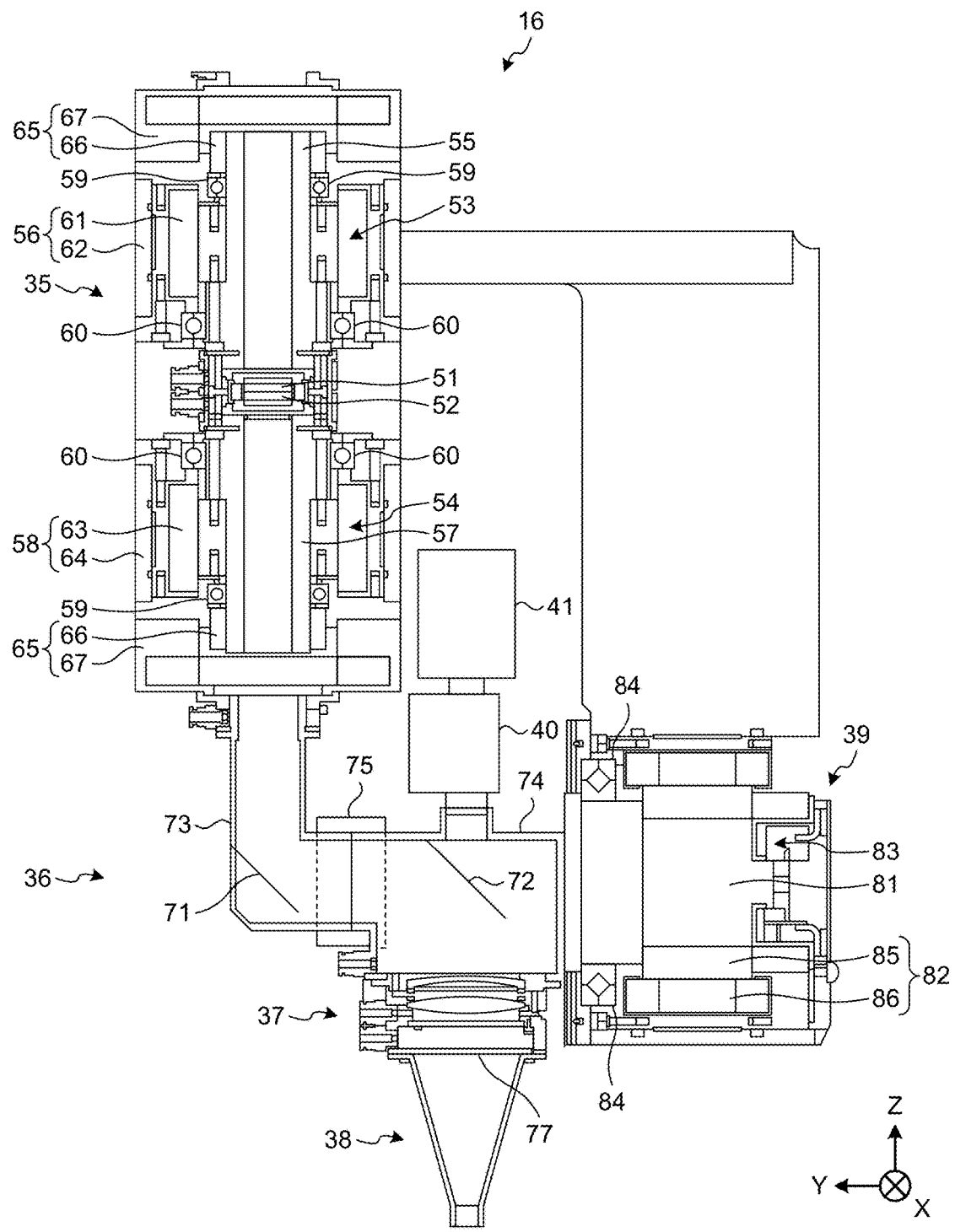
FIG. 3 is an enlarged schematic diagram in which a part from a laser turning unit to a nozzle of the irradiation head according to the first embodiment is enlarged.
Figure 4:
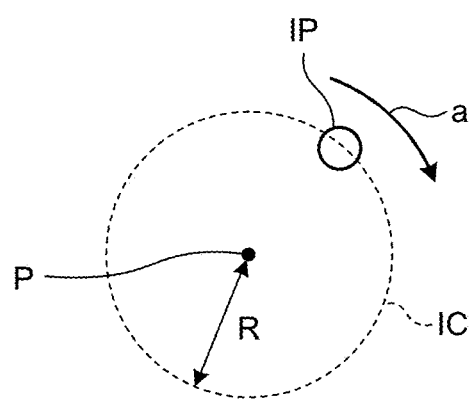
FIG. 4 is an explanatory diagram of an irradiation position of laser to be emitted to a workpiece.

Next, the irradiation head 16 will be described with reference to FIGS. 2 to 4. FIG. 2 is an explanatory diagram of a schematic structure of the irradiation head according to the first embodiment. FIG. 3 is an enlarged schematic diagram in which a part from the laser turning unit to the nozzle of the irradiation head according to the first embodiment is enlarged. FIG. 4 is an explanatory diagram of an irradiation position of the laser to be emitted to the workpiece.

As illustrated in FIG. 2, the irradiation head 16 includes a collimate optical system 34, a laser turning unit 35, a catoptric system 36, a condensing optical system 37, a nozzle 38, an index mechanism 39, an imaging unit 40, and a gap detecting unit 41. The irradiation head 16 has the collimate optical system 34, the laser turning unit 35, the catoptric system 36, the condensing optical system 37, and the nozzle 38 arranged therein in this order on the light path of laser L output from the guiding optical system 14 from the upstream side to the downstream side. The irradiation head 16 irradiates the workpiece W facing to the nozzle 38 with the laser L output from the guiding optical system 14.

The collimate optical system 34 is arranged opposite to an end surface to which the laser L of the guiding optical system 14 is emitted. That is, the collimate optical system 34 is arranged between the guiding optical system 14 and the laser turning unit 35. The collimate optical system 34 includes a collimator lens and the like and emits the laser L output from the guiding optical system 14 toward the laser turning unit 35 as collimate light.

As illustrated in FIGS. 2 and 4, the laser turning unit 35 rotates the laser L around the center P of the light path and turns the irradiation laser, that is, irradiation positions IP of the laser L on the workpiece W. As illustrated in FIGS. 2 and 3, the laser turning unit 35 includes a first prism 51, a second prism 52, a first rotating mechanism 53, and a second rotating mechanism 54.

The first prism 51 refracts the laser L and tilts it relative to an optical axis OA. The second prism 52 controls a condensing position by refracting the laser L which has been refracted by the first prism 51 again. Accordingly, the light path of the output laser L which has passed through the laser turning unit 35 is different from the light path of the laser L before passing through the laser turning unit 35.

The first rotating mechanism 53 includes a first spindle 55 for holding the first prism 51 and a first hollow motor 56. The first spindle 55 is inserted into the first hollow motor 56, and the first hollow motor 56 rotates the first spindle 55. The second rotating mechanism 54 includes a second spindle 57 for holding the second prism 52 and a second hollow motor 58. The second spindle 57 is inserted into the second hollow motor 58, and the second hollow motor 58 rotates the second spindle 57. The first spindle 55 and the second spindle 57 are cylindrical members, and parts of the light path of the laser L in the first spindle 55 and the second spindle 57 are hollow. The first spindle 55 and the second spindle 57 are supported via bearings 59 and 60. The bearings 59 and 60 are rolling bearings such as a rolling ball bearing. The first rotating mechanism 53 and the second rotating mechanism 54 can synchronously rotate and can relatively rotate with each other.

The first hollow motor 56 has a hollow rotor 61 fixed to an outer peripheral surface of the first spindle 55 and a stator 62 arranged opposite to the hollow rotor 61. The first hollow motor 56 rotates the first spindle 55 and the first prism 51 together. The second hollow motor 58 includes a hollow rotor 63 fixed to an outer peripheral surface of the second spindle 57 and a stator 64 arranged opposite to the hollow rotor 63. The second hollow motor 58 rotates the second spindle 57 and the second prism 52 together.

Also, the first rotating mechanism 53 and the second rotating mechanism 54 respectively have encoders 65 for detecting a rotation speed and a relative position between rotation units (first spindle 55 and hollow rotor 61, and second spindle 57 and hollow rotor 63) and fixing units (stators 62 and 64). The encoder 65 includes an identifier 66 fixed to the side of the rotation unit and a detection unit 67 which is fixed to the side of the fixing unit and detects the identifier 66. The encoder 65 can detect a relative position of the rotation unit by detecting the identifier 66 by the detection unit 67. The encoder 65 outputs information on the detected rotation speed and rotation position (phase angle) of the rotation unit to the control device 30. Also, it is preferable to use, for example, a detector for detecting the rotation position (phase angle) by a resolution of one-several thousandth degree (equal to or less than 0.001 degree) as the encoder 65.

The first rotating mechanism 53 and the second rotating mechanism 54 can change a difference between the phase angles of the first prism 51 and the second prism 52. Accordingly, as illustrated in FIG. 4, the laser irradiation point can be eccentrically moved to the irradiation position IP separated by a distance (turning radius R) corresponding to the difference between the phase angles of the first prism 51 and the second prism 52 from the center P of the light path of the axis of rotation. When the first rotating mechanism 53 and the second rotating mechanism 54 are synchronously rotated at the same rotation cycle while the difference between the phase angles of the first prism 51 and the second prism 52 is maintained, the laser irradiation points draw a circular trajectory having the turning radius R. Also, when the first prism 51 and the second prism 52 are not synchronously rotated (rotated at different rotation cycles), the laser irradiation points can be turned as increasing and decreasing the turning radius of the laser irradiation point. Therefore, an arbitrary curved trajectory can be drawn.

In the present embodiment, the difference between the phase angles of the first hollow motor 56 and the second hollow motor 58 is an angle of a relative displacement between the rotation positions (phase angle) of the first hollow motor 56 and the second hollow motor 58. Also, an error of the difference between the phase angles of the first hollow motor 56 and the second hollow motor 58 is an error of angle of a phase displacement between the first hollow motor 56 and the second hollow motor 58.

Also, as illustrated in FIGS. 2 and 4, the turning radius R is a distance from the center P of the light path to the irradiation position IP of the laser L emitted to the workpiece W. Also, the turning radius R is a radius of the laser L, which is emitted to the workpiece W, for turning around the center P. The turning radius R is variable because the turning radius R of the laser L emitted to the workpiece W is changed by changing the difference between the phase angles of the first prism 51 and the second prism 52. The turning speed is the number of times of the turns of the irradiation position IP of the laser L emitted to the workpiece W around the center P per unit time.

As illustrated in FIGS. 2 and 3, the catoptric system 36 includes a first reflecting mirror 71 for reflecting the laser L which has passed through the laser turning unit 35, a second reflecting mirror 72 for reflecting the laser L reflected by the first reflecting mirror 71 again, a cylindrical part 73, and a nozzle mounting part 74. The catoptric system 36 reflects the laser L output from the laser turning unit 35 to the condensing optical system 37 by the first reflecting mirror 71 and the second reflecting mirror 72. The second reflecting mirror 72 is a half mirror, and it enables the imaging unit 40 to image a part to be processed of the workpiece W. The cylindrical part 73 is coupled with the nozzle mounting part 74 by a joint unit 75.

The condensing optical system 37 includes a plurality of lens and collects the laser L reflected by the second reflecting mirror 72 by using the plurality of lens. Then, the condensing optical system 37 forms the laser L having a predetermined focal point distance and focal point depth. The condensing optical system 37 irradiates the workpiece W with the laser L having a predetermined spot diameter.

The nozzle 38 has a hollow conical shape of which the diameter is gradually reduced as it goes toward the tip in an advancing direction of the laser L. The nozzle 38 is mounted to the nozzle mounting part 74 via the condensing optical system 37. The nozzle 38 includes a light transparent member 77 to prevent the condensing optical system 37 from being damaged by a sputter and the like generated at a processing point of the workpiece W. Also, an assist gas supply source 78 supplies assist gas to the nozzle 38, and the nozzle 38 can inject the assist gas toward the workpiece W.

The index mechanism 39 includes an index shaft 81, a hollow motor 82, and an index angle detecting unit 83. The index shaft 81 is coupled to the nozzle mounting part 74 and integrally rotated with the nozzle mounting part 74. The index shaft 81 is supported by the bearing 84 so as to rotate around the y-axis. The bearing 84 is, for example, a static pressure bearing (fluid bearing). The hollow motor 82 includes a hollow rotor 85 fixed to an outer peripheral surface of the index shaft 81 and a stator 86 arranged opposite to the hollow rotor 85. The hollow motor 82 rotates around the index shaft 81 and drives the nozzle 38 mounted to the nozzle mounting part 74 so that the nozzle 38 can swing around the index shaft 81 (direction of an arrow d). That is, the hollow motor 82 drives the nozzle 38 so that the nozzle 38 can swing around the y-axis. Accordingly, the index mechanism 39 rotates the nozzle mounting part 74 of the catoptric system 36 around the index shaft 81 as a rotation center and can rotate the second reflecting mirror 72 coaxially arranged with the index shaft 81 according to the rotation of the nozzle mounting part 74. Therefore, even when the index angle is changed, the laser L reflected by the second reflecting mirror 72 can be emitted from the nozzle 38. Also, since the index mechanism 39 can make the nozzle 38 swing via the nozzle mounting part 74, the increase in size can be prevented. Also, the index angle detecting unit 83 has an encoder which detects a relative position (index angle) between the rotation units (index shaft 81 and hollow rotor 85) and the fixing unit (stator 86). The encoder outputs detected information on the index angle of the rotation unit to the control device 30.

The imaging unit 40 is, for example, a camera having a charge coupled device (CCD) image sensor and the like. The imaging unit 40 images the irradiation position IP, the turning radius R, and the like of the laser L and generates an image data from the imaged image. Then, the imaging unit 40 outputs the image data to the control device 30. The imaging unit 40 is mounted to the nozzle mounting part 74 at a position opposite to the nozzle 38 across the nozzle mounting part 74. The imaging unit 40 is coaxially arranged with the center P of the light path.

The gap detecting unit 41 is a gap measuring device for using laser light. The gap detecting unit 41 detects a gap between a focal point of the laser L to be emitted to the workpiece W and the workpiece W. The gap detecting unit 41 outputs the detected gap to the control device 30. The gap detecting unit 41 is coupled to the imaging unit 40 and coaxially arranged with the center P of the light path.

Figure 5:
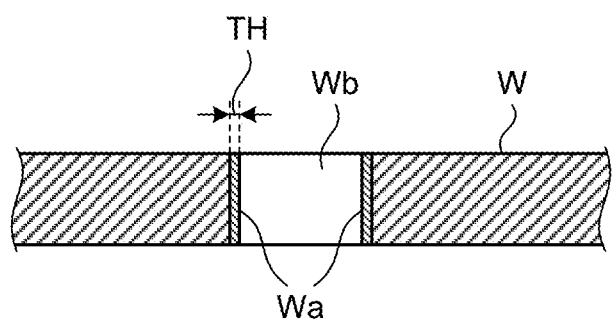
FIG. 5 is an explanatory diagram of a cross section of a workpiece to which boring processing has been performed.
Figure 6:
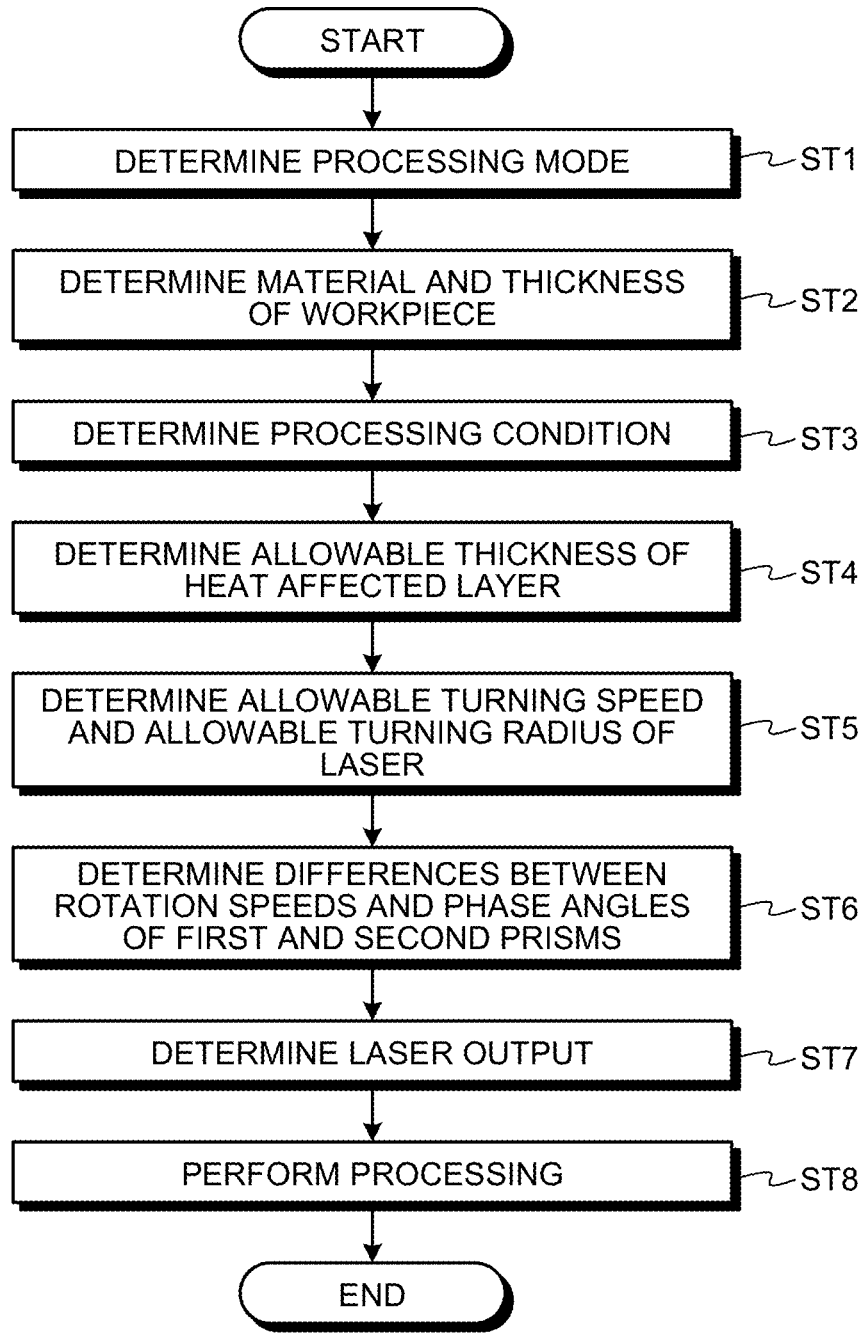
FIG. 6 is a flowchart of an exemplary control operation of the processing apparatus.

Next, processing by the processing apparatus 10 will be described with reference to FIGS. 4 to 6. FIG. 5 is an explanatory diagram of the cross section of the workpiece to which the boring processing has been performed. FIG. 6 is a flowchart of an exemplary control operation of the processing apparatus.

First, the processing apparatus 10 (control device 30) determines a processing mode as illustrated in FIG. 6 (step ST1). For example, the processing apparatus 10 (control device 30) confirms an operation, which indicates which one of the processing below is performed, input by a worker such as an operator. The processing includes cutting processing, boring processing, welding, cladding, surface reforming processing, surface finishing, and laser lamination molding. Then, the processing apparatus 10 determines the processing mode based on the confirmed operation.

Next, the processing apparatus 10 (control device 30) determines the material and the thickness of the workpiece W (step ST2). For example, the processing apparatus 10 (control device 30) confirms the operation in which the material and the thickness of the workpiece W is input by the worker and determines the material and the thickness of the workpiece W based on the confirmed operation.

Next, the processing apparatus 10 (control device 30) determines a processing condition (step ST3). For example, the processing apparatus 10 (control device 30) confirms the operation in which the processing conditions such as a position, shape, depth, and the like of the processing performed to the workpiece W in the processing mode determined in step ST1 are input by the worker. Then, the processing apparatus 10 determines the processing conditions such as the position, the shape, the depth, and the like of the processing performed to the workpiece W based on the confirmed operation.

Next, the processing apparatus 10 (control device 30) determines an allowable thickness of a heat affected layer Wa (refer to FIG. 5) (step ST4). For example, the processing apparatus 10 (control device 30) obtains the processing mode determined in step ST1, the material and the thickness of the workpiece W determined in step ST2, and the processing conditions determined in step ST3. Also, the processing apparatus 10 refers to a control map (processing condition control map) for determining correlation between the processing mode, the material and the thickness of the workpiece W, the processing condition, and the allowable thickness of the heat affected layer Wa. Accordingly, the allowable thickness of the heat affected layer Wa is determined.

Next, the processing apparatus 10 (control device 30) determines an allowable turning speed and an allowable turning radius of the laser L (step ST5). For example, the processing apparatus 10 (control device 30) determines an allowable turning speed range and an allowable turning radius range of the laser L by referring to the control map (turning condition control map) for determining the correlation between the thickness TH (refer to FIG. 5) of the heat affected layer Wa and the turning speed and the turning radius R of the laser L based on the allowable thickness of the heat affected layer Wa determined in step ST4. In the allowable turning speed range and the allowable turning radius range of the laser L, the thickness TH of the heat affected layer Wa does not exceed the allowable thickness. In step ST5, when the processing mode determined in step ST1 is the boring processing, the turning radius R is not required. Therefore, only the turning speed may be determined.

Next, the processing apparatus 10 (control device 30) determines differences the rotation speed of the first prism 51, the rotation speed of the second prism 52, and the difference in a phase angle between the first prism 51 and the second prism 52 (step ST6). For example, the processing apparatus 10 (control device 30) deteiniines the turning speed included in the allowable turning speed range of the laser L determined in step ST5 as the rotation speeds of the first prism 51 and the second prism 52. By referring to the control map (phase angle control map) for determining the correlation between the turning radius R of the laser L and the difference between the phase angles of the first prism 51 and the second prism 52, the processing apparatus 10 determines the difference of the phase angles included in the allowable turning radius range of the laser L determined in step ST5 as the difference between the phase angles of the first prism 51 and the second prism 52.

Next, the processing apparatus 10 (control device 30) determines a laser output (step ST7). For example, the processing apparatus 10 (control device 30) obtains the allowable thickness of the heat affected layer Wa determined in step ST4. The processing apparatus 10 refers to a control map (laser output control map) for determining the correlation between the thickness TH of the heat affected layer Wa and the output of the laser L, selects a peak output and a pulse width of the laser L, and determines the laser output.

Next, the processing apparatus 10 (control device 30) performs the processing to the workpiece W (step ST8). For example, the processing apparatus 10 (control device 30) oscillates the laser oscillator 12 based on the laser output determined in step ST7 and makes the laser oscillator 12 emit the laser L. At the same time, the processing apparatus 10 adjusts the rotation of the first hollow motor 56 and the second hollow motor 58 the rotation speeds and the difference in the phase angle determined in step ST6. Then, the processing apparatus 10 irradiates the workpiece W with the laser L and performs the processing to the workpiece W. According to the above-mentioned steps ST1 to ST8, the processing apparatus 10 (control device 30) performs the processing to the workpiece W.

Here, when the processing mode determined in step ST1 is the boring processing, in step ST8, the laser L emitted from the laser oscillator 12 enters the incidence end of the irradiation head 16 via the guiding optical system 14. As illustrated in FIGS. 2, 4, and 5, the laser L is refracted by the first prism 51 and the second prism 52 which rotates in a direction of an arrow a according to the rotation speeds and the difference in the phase angle determined in step ST6, and a position which is eccentrically moved from the center P of the light path having the same axis as the optical axis OA of the laser L before the refraction is irradiated with the laser L. When the first prism 51 and the second prism 52 are rotated at the same rotation cycle in this state, the laser irradiation point turns around the center P of the light path of the axis of rotation which has the same axis as the optical axis OA of the laser L before the refraction. The irradiation position IP of the laser L moves on a virtual circle IC turning around the center P, and a bore Wb is formed in the workpiece W. When the processing mode determined in step ST1 is the boring processing, a bore diameter is almost determined according to a set value. Whereas, in a case of the welding and the cladding, the turning radius R can be used to control the amount of scattering objects on the heat affected layer Wa, the surface, and the rear surface in addition to the turning speed.

Figure 7:
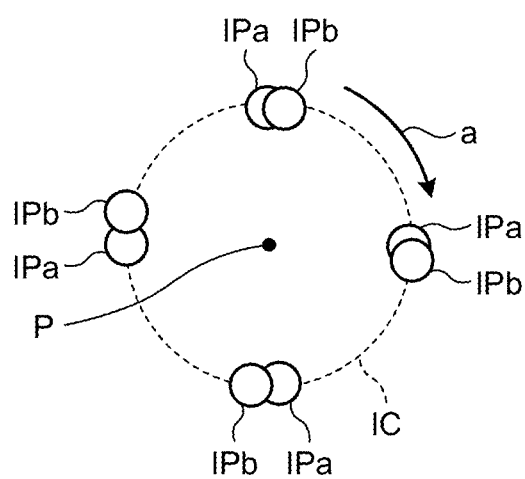
FIG. 7 is an explanatory diagram of an irradiation operation of the laser emitted by the processing apparatus.
Figure 8:
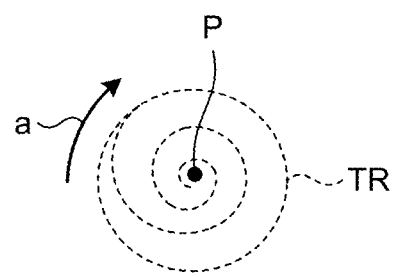
FIG. 8 is a schematic diagram of an exemplary track of the laser emitted by the processing apparatus.
Figure 9:
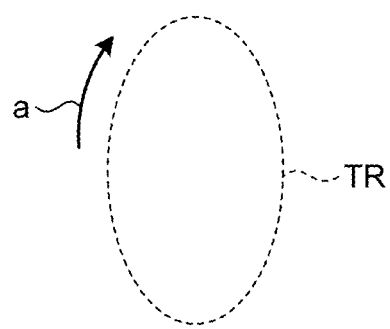
FIG. 9 is a schematic diagram of an exemplary track of the laser emitted by the processing apparatus.
Figure 10:
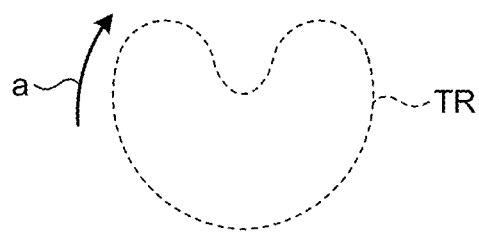
FIG. 10 is a schematic diagram of an exemplary track of the laser emitted by the processing apparatus.
Figure 11:
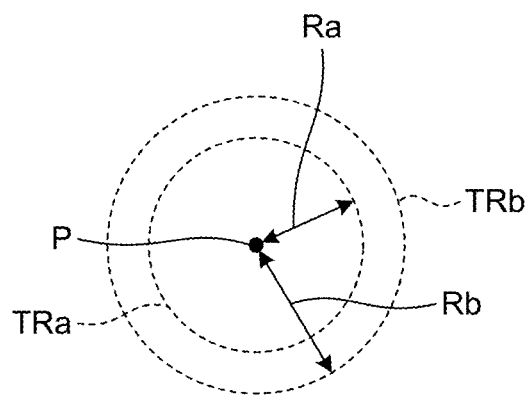
FIG. 11 is a schematic diagram of an exemplary track of the laser when the boring processing is divided and performed a plurality of times.

Next, an irradiation operation of the laser L by the processing apparatus 10 will be described with reference to FIGS. 7 to 11. FIG. 7 is an explanatory diagram of the irradiation operation of the laser emitted by the processing apparatus. FIG. 8 is a schematic diagram of an exemplary track of the laser emitted by the processing apparatus. FIG. 9 is a schematic diagram of an exemplary track of the laser emitted by the processing apparatus. FIG. 10 is a schematic diagram of an exemplary track of the laser emitted by the processing apparatus. FIG. 11 is a schematic diagram of an exemplary track of the laser when the boring processing is divided and performed for a plurality of times.

When the workpiece W is irradiated with the laser L as the laser L is turned ON/OFF at a constant period, as illustrated in FIG. 7, it is preferable that the processing apparatus 10 set the period to turn ON/OFF the laser L to a non-integral multiple of a turning period of the irradiation position IP. That is, the processing apparatus 10 can irradiate irradiation positions IPa with the laser L in the first round and can irradiate irradiation positions IPb with the laser L in the second round by shifting the period to turn ON/OFF the laser L and the turning period of the irradiation position IP. That is, the processing apparatus 10 can sequentially shift irradiation positions by similarly repeating ON/OFF of the laser L in and after the third round. Accordingly, the irradiation positions of the laser L of each round is shifted, and the processing apparatus 10 can efficiently irradiate a region to be processed of the workpiece W with the laser L.

Also, when the first prism 51 and the second prism 52 are rotated while the difference between the phase angles of the first prism 51 and the second prism 52 is continuously changed, as illustrated in FIG. 8, the processing apparatus 10 can irradiate the workpiece W with the laser L in a spiral track TR which is gradually separated from the center P. Accordingly, the processing apparatus 10 can accurately perform the processing to the workpiece W having the thickness where the laser L hardly enters by irradiating it with the laser L in a spiral track.

Similarly, as illustrated in FIGS. 9 and 10, the processing apparatus 10 can irradiate the workpiece W with the laser L in an elliptic and heart-shaped track TR. That is, the processing apparatus 10 changes the turning radius R of the laser L by continuously changing the difference between the phase angles of the first prism 51 and the second prism 52 while rotating the first prism 51 and the second prism 52. Accordingly, the processing apparatus 10 can irradiate the workpiece W with the laser L in various tracks TR. That is, the processing apparatus 10 can irradiate the workpiece W with the laser L in the various-shaped tracks TR by controlling the rotation speed of the first prism 51, the rotation speed of the second prism 52, and the difference in the phase angle between the first prism 51 and the second prism 52.

Also, in a case where the turning radius R is corrected in consideration of the heat affected layer Wa after the turning radius R of the laser L suitable for the processing performed to the workpiece W has been calculated from an optical theoretical value, as illustrated in FIG. 11, the processing apparatus 10 irradiates the workpiece W with the laser L in a circular track TRa smaller than the bore diameter of a target bore to which the boring processing is performed in the first round. Then, the processing apparatus 10 irradiates the workpiece W with the laser L in a circular track TRb having the same size as that of the bore diameter of the target bore to which the boring processing is performed in the second round. In this case, it is preferable that a turning radius Ra of the laser L in the first round be a turning radius smaller than the target bore. Also, the turning radius to make the target bore is calculated from the optical theoretical value, and after that, it is preferable that a turning radius Rb of the laser L in the second round be a turning radius obtained by correcting the above calculated turning radius so that the thickness TH of the heat affected layer Wa in the target bore becomes within the range of the allowable thickness. Accordingly, the heat is largely spread in the first round when the workpiece W is irradiated with the laser L first. However, the processing apparatus 10 can prevent the heat spread by making a bore smaller than the target bore in the first round and can make the target bore in the second round. That is, since the processing apparatus 10 can perform rough processing in the first round and can perform finishing in the second round, the processing apparatus 10 can perform the processing with high accuracy.

Also, when the processing mode is the boring processing, the processing apparatus 10 performs the boring processing by irradiating the workpiece W with the laser L with the turning radius R which is the same as the bore diameter of the target bore. Therefore, the processing apparatus 10 can make the processing time shorter than that in a case where the boring processing is performed by driving the x-axis moving mechanism 22, the y-axis moving mechanism 26, and the c-axis rotating mechanism 24.

Also, it is preferable that the processing apparatus 10 make an error of the difference between the phase angles of the first hollow motor 56 and the second hollow motor 58 be equal to or less than 0.1°. That is, it is preferable that the processing apparatus 10 make an error of the difference of the phase angles between the first prism 51 and the second prism 52 be equal to or less than 0.1°. In this case, the control device 30 makes the error of the difference between the phase angles of the first prism 51 and the second prism 52 determined in step ST6 described above be equal to or less than 0.1° based on the rotation speeds and the rotation positions (phase angle) of the first spindle 55 and the second spindle 57 output from the encoder 65. Accordingly, the processing apparatus 10 can make the gap of the turning radius R be equal to or less than several tens of μm although it is according to the optical characteristics of the first prism 51 and the second prism 52. The processing apparatus 10 can accurately irradiate the workpiece W with the laser L and perform the processing to the workpiece W.

Also, when an output frequency of the laser L is less than 1 kHz, it is preferable that the processing apparatus 10 rotate the first prism 51 and the second prism 52 at equal to or more than 20 rpm. When the output frequency of the laser L is equal to or more than 1 kHz, it is preferable that the processing apparatus 10 rotate the first prism 51 and the second prism 52 at equal to or more than 200 rpm. That is, when the output frequency of the laser L is less than 1 kHz, it is preferable that the processing apparatus 10 make the turning speed of the laser L emitted to the workpiece W be equal to or more than 20 rpm. When the output frequency of the laser L is equal to or more than 1 kHz, it is also preferable that the turning speed of the laser L be equal to or more than 200 rpm.

The processing apparatus 10 can perform the processing at a higher speed by adjusting the rotation speeds of the first prism 51 and the second prism 52 according to the output frequency of the laser L. In addition, processing accuracy can be improved. That is, since the energy of the laser L emitted to the workpiece W becomes relatively high when the output frequency of the laser L is relatively high, the processing apparatus 10 rotates the laser L at a relatively high speed. Since the energy of the laser L emitted to the workpiece W is relatively low when the output frequency of the laser L is relatively low, the processing apparatus 10 rotates the laser L at a relatively low speed. Also, the laser L can be uniformly irradiated in a certain range by turning the laser L emitted to the workpiece W at a relatively high speed. It can be prevented that the output of the laser L is concentrated into a partial area. Accordingly, the processing apparatus 10 can easily control the thickness TH of the heat affected layer Wa and can increase the processing accuracy.

Also, by turning the laser L emitted to the workpiece W at a relatively high speed, even when the output of the laser L is relatively high, a thermal effect (effect of thermal damage) can be reduced, and the thickness TH of the heat affected layer Wa can be reduced. Also, a processing speed can be accelerated while a processing quality is maintained.

Also, the processing apparatus 10 can suitably perform the cutting processing, the boring processing, the welding, the cladding, the surface reforming processing, the surface finishing, or the laser lamination molding by using a metal material such as a steel plate as the workpiece W. Also, a cut surface can be more suitable shape. Accordingly, the processing apparatus 10 can increase the processing accuracy. Also, the processing apparatus 10 can prevent the concentration of the output of the laser L into a partial area by turning and emitting the laser L. Therefore, the laser L with high output can be used. Accordingly, the laser L can be suitably used for the welding and the cladding and can be suitably used for a material with a high thermal resistance.

Also, since the processing apparatus 10 rotationally drives the first rotating mechanism 53 by the first hollow motor 56 and rotationally drives the second rotating mechanism 54 by the second hollow motor 58, the length in a radial direction of the first hollow motor 56 and the second hollow motor 58 can be reduced. Accordingly, the irradiation head 16 can be miniaturized. That is, the increase in size of the processing apparatus 10 can be prevented.

Also, the control device 30 determines the rotation speeds of the first rotating mechanism 53 and the second rotating mechanism 54 so that the processing apparatus 10 performs the processing to the workpiece W while the thickness TH of the heat affected layer Wa is kept within the allowable thickness.

Figure 12:
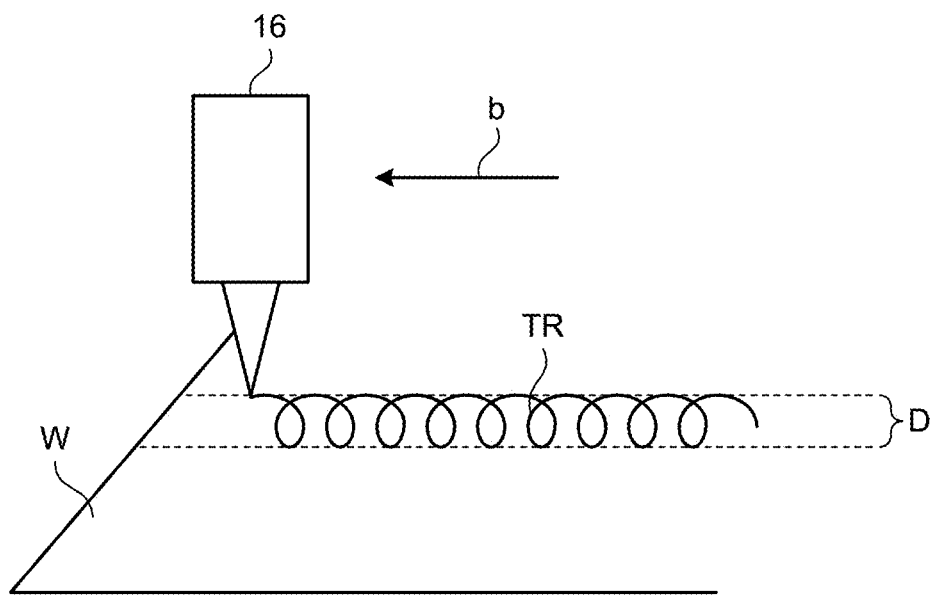
FIG. 12 is an explanatory diagram of an operation of cutting processing by the processing apparatus.
Figure 13:
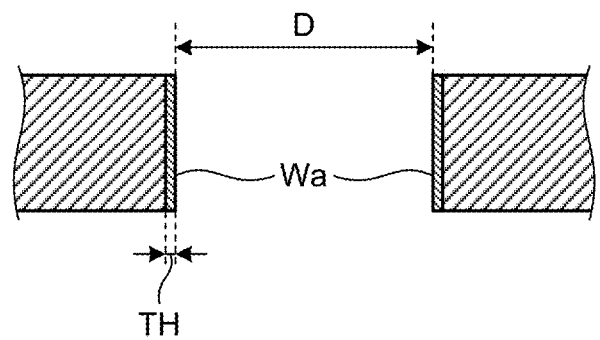
FIG. 13 is an explanatory diagram of a heat affected layer of a workpiece to which the cutting processing is performed.
Figure 14:
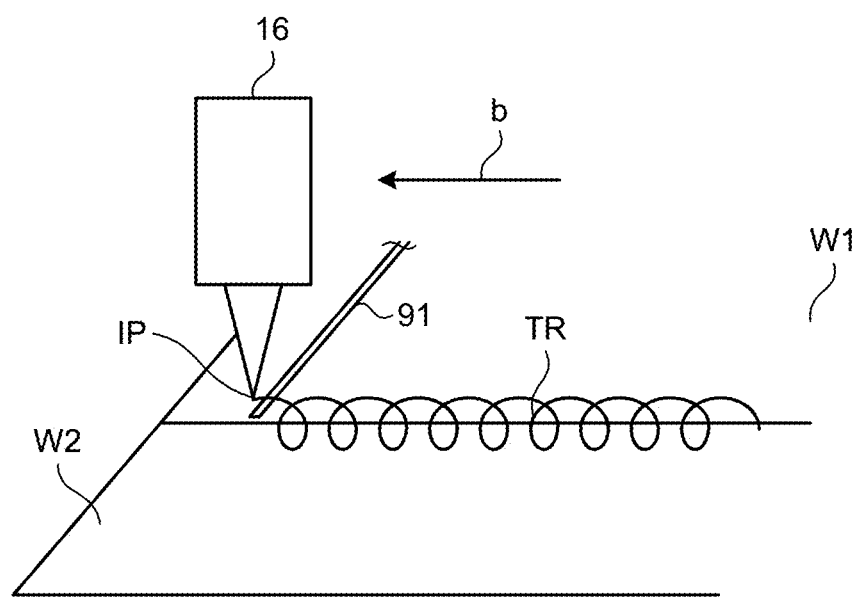
FIG. 14 is an explanatory diagram of an operation of welding by the processing apparatus.
Figure 15:
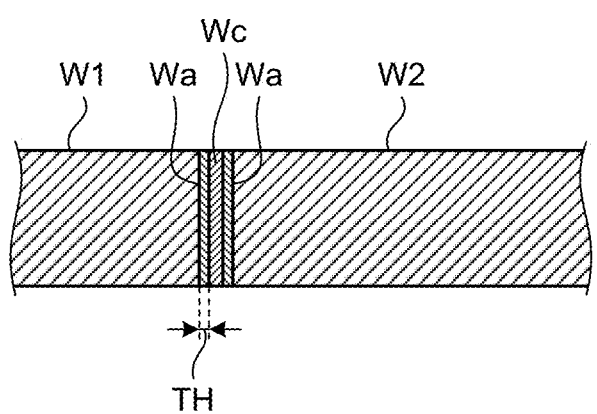
FIG. 15 is an explanatory diagram of a heat affected layer of a welded workpiece.
Figure 16:
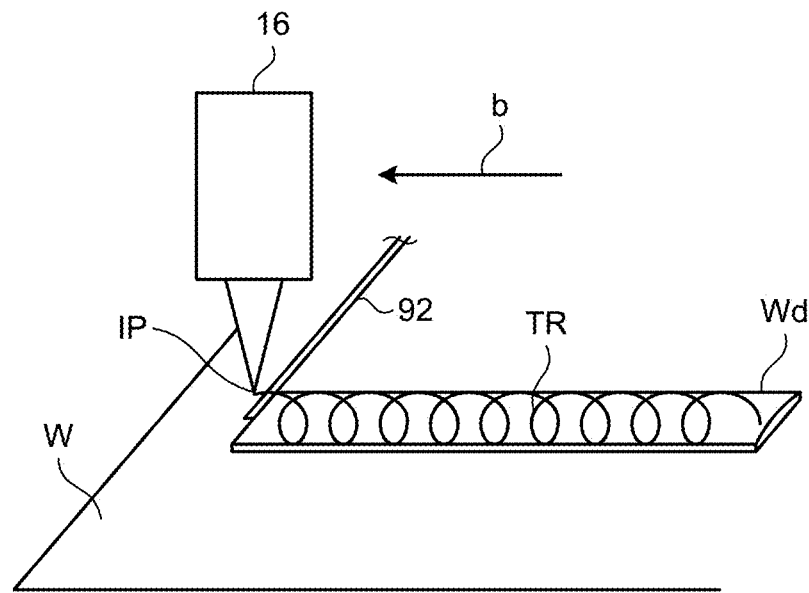
FIG. 16 is an explanatory diagram of an operation of cladding by the processing apparatus.
Figure 17:
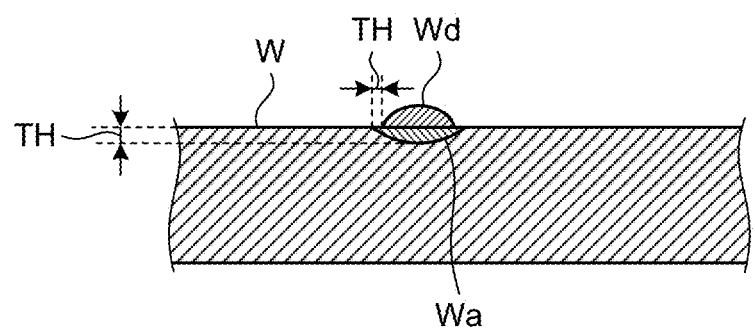
FIG. 17 is an explanatory diagram of a heat affected layer of a workpiece to which the cladding is performed.
Figure 18:
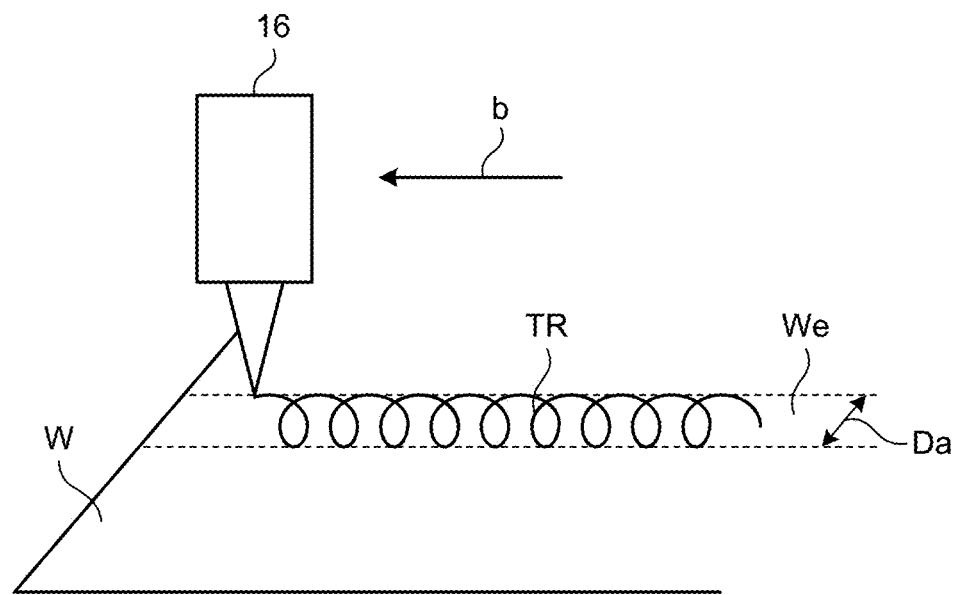
FIG. 18 is an explanatory diagram of an operation of surface reforming processing by the processing apparatus.
Figure 19:
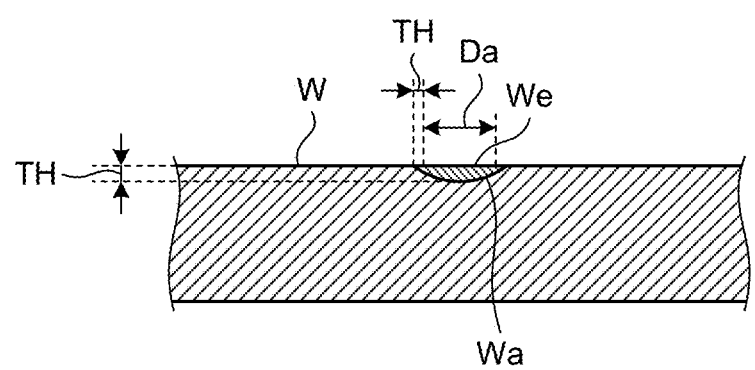
FIG. 19 is an explanatory diagram of a heat affected layer of a workpiece to which the surface reforming processing is performed.

Next, other exemplary processing by the processing apparatus 10 will be described with reference to FIGS. 12 to 19. FIG. 12 is an explanatory diagram of an operation of the cutting processing by the processing apparatus. FIG. 13 is an explanatory diagram of the heat affected layer of the workpiece to which the cutting processing is performed. FIG. 14 is an explanatory diagram of an operation of the welding by the processing apparatus. FIG. 15 is an explanatory diagram of the heat affected layer of a welded workpiece. FIG. 16 is an explanatory diagram of an operation of the cladding by the processing apparatus. FIG. 17 is an explanatory diagram of the heat affected layer of the workpiece to which the cladding is performed. FIG. 18 is an explanatory diagram of an operation of the surface reforming processing by the processing apparatus. FIG. 19 is an explanatory diagram of the heat affected layer of the workpiece to which the surface reforming processing is performed.

When the processing mode is the cutting processing, as illustrated in FIGS. 12 and 13, the processing apparatus 10 turns and emits the laser L in a direction of an arrow b as the track TR by scanning with the irradiation head 16 in the direction of the arrow b which is an arbitrary direction on the XY surface (horizontal surface). Therefore, the thickness TH of the heat affected layer Wa can be suppressed equal to or less than the allowable thickness. Accordingly, the processing apparatus 10 can irradiate the workpiece W with the laser L of an irradiation width D and can cut the workpiece W by the irradiation width D. Also, the processing apparatus 10 can control the turning speed of the laser L emitted to the workpiece W and can control the allowable thickness of the thickness TH of the heat affected layer Wa by controlling the rotation speeds of the first prism 51 and the second prism 52.

Also, when the processing mode is the welding, as illustrated in FIGS. 14 and 15, the processing apparatus 10 turns and emits the laser L in the direction of the arrow b as the track TR by scanning with the irradiation head 16 in the direction of the arrow b (arbitrary direction on the XY surface) and supplying a welding wire 91 and the like to the irradiation position IP of the laser L. Accordingly, the processing apparatus 10 can weld one workpiece W1 which has a groove shape such as an I shape with the other workpiece W2 by a welding unit Wc. Also, the processing apparatus 10 can control the turning speed of the laser L emitted to the grooves of the one workpiece W1 and the other workpiece W2 and can control the allowable thickness of the thickness TH of the heat affected layer Wa by controlling the rotation speeds of the first prism 51 and the second prism 52.

Also, when the processing mode is the cladding, as illustrated in FIGS. 16 and 17, the processing apparatus 10 turns and emits the laser L in the direction of the arrow b as the track TR by scanning with the irradiation head 16 in the direction of the arrow b (arbitrary direction of the XY surface) and supplying an overlay welding material wire 92 and the like to the irradiation position IP of the laser L. Accordingly, the processing apparatus 10 can form an overlay welding part Wd on the workpiece W. Also, the processing apparatus 10 can control the turning speed of the laser L emitted to the workpiece W and can control the allowable thickness of the thickness TH of the heat affected layer Wa by controlling the rotation speeds of the first prism 51 and the second prism 52.

Also, when the processing mode is the surface reforming processing, as illustrated in FIGS. 18 and 19, the processing apparatus 10 turns and emits the laser L in the direction of the arrow b as the track TR by scanning with the irradiation head 16 in the direction of the arrow b (arbitrary direction of the XY surface). Accordingly, by irradiating the workpiece W with the laser L of an irradiation width Da, for example, the processing apparatus 10 can smooth a surface of the workpiece W, miniaturize material particles on the surface of the workpiece W, and form a surface reforming unit We which is made by reforming the surface of the workpiece W. Also, the processing apparatus 10 can control the turning speed of the laser L emitted to the workpiece W and can control the allowable thickness of the thickness TH of the heat affected layer Wa by controlling the rotation speeds of the first prism 51 and the second prism 52.

In the present embodiment, the heat affected layer Wa of the workpiece W includes at least one of a remelted layer, an oxide film, a crack, and a dross formed by the laser L emitted to the workpiece W. The remelted layer is a layer in which a solid of the workpiece W becomes liquid by the irradiation with the laser L and solidified again at the time of the processing. The remelted layer is different according to the processing mode. In a case of the boring processing and the cutting processing, the remelted layer is not a layer which is formed ahead in the irradiation direction (advancing direction) of the laser L and is a layer formed in a direction perpendicular to the irradiation direction (advancing direction) of the laser L. Also, the remelted layer is formed on an inner circumference surface of the bore Wb formed by being irradiated with the laser L and on the cut surface of the cut workpiece W. Also, when the processing mode is the welding, the cladding, the surface reforming processing, the surface finishing, and the laser lamination molding, the remelted layer is a layer formed ahead in the irradiation direction (advancing direction) of the laser L and the direction perpendicular to the irradiation direction. The remelted layer is formed around and below the welding unit Wc formed by being irradiated with the laser L, around and below the overlay welding part Wd, and around and below the surface reforming unit We.

When the workpiece W is the metal and the like, the oxide layer is the oxide film formed on the inner circumference surface and the cut surface of the bore Wb of the workpiece W in a case where the oxygen is used as the assist gas. The workpiece W is rapidly heated by the irradiation with the laser L, and the crack which is a minute crack (microcrack) is generated on the inner circumference surface and the cut surface of the bore Wb of the workpiece W at the time of the rapid heating. The dross is a deposit which is made by making a material liquefied when the boring processing and cutting is performed to the workpiece W become a melt and solidifying the melt when it is attached to the inner circumference surface and the cut surface of the bore Wb of the workpiece W. The thickness of the heat affected layer Wa of the workpiece W includes the thickness of the remelted layer, the thickness of the oxide film, the depth of the crack, and the thickness of the deposit.

The allowable thickness is a thickness in which the inner circumference surface of the bore Wb, the thickness TH of the heat affected layer Wa of a cutting part and the welding unit Wc, the thickness TH of the heat affected layer Wa of the overlay welding part Wd and the surface reforming unit We, and the like are within the allowable range in the workpiece W as a product to which the processing is performed when the processing including at least one of the cutting processing, the boring processing, the welding, the cladding, the surface reforming processing, the surface finishing, and the laser lamination molding is performed to the workpiece W.

Also, the allowable thickness is different for each processing mode. However, in a case of the boring processing and the cutting processing, the allowable thickness is the length in a direction perpendicular to the irradiation direction (advancing direction) of the laser L. Also, when the processing mode is the welding, the cladding, the surface reforming processing, the surface finishing, and the laser lamination molding, the allowable thickness is the length in the irradiation direction (advancing direction) of the laser L and the length in the direction perpendicular to the irradiation direction of the laser L.

[Second Embodiment]

Figure 20:
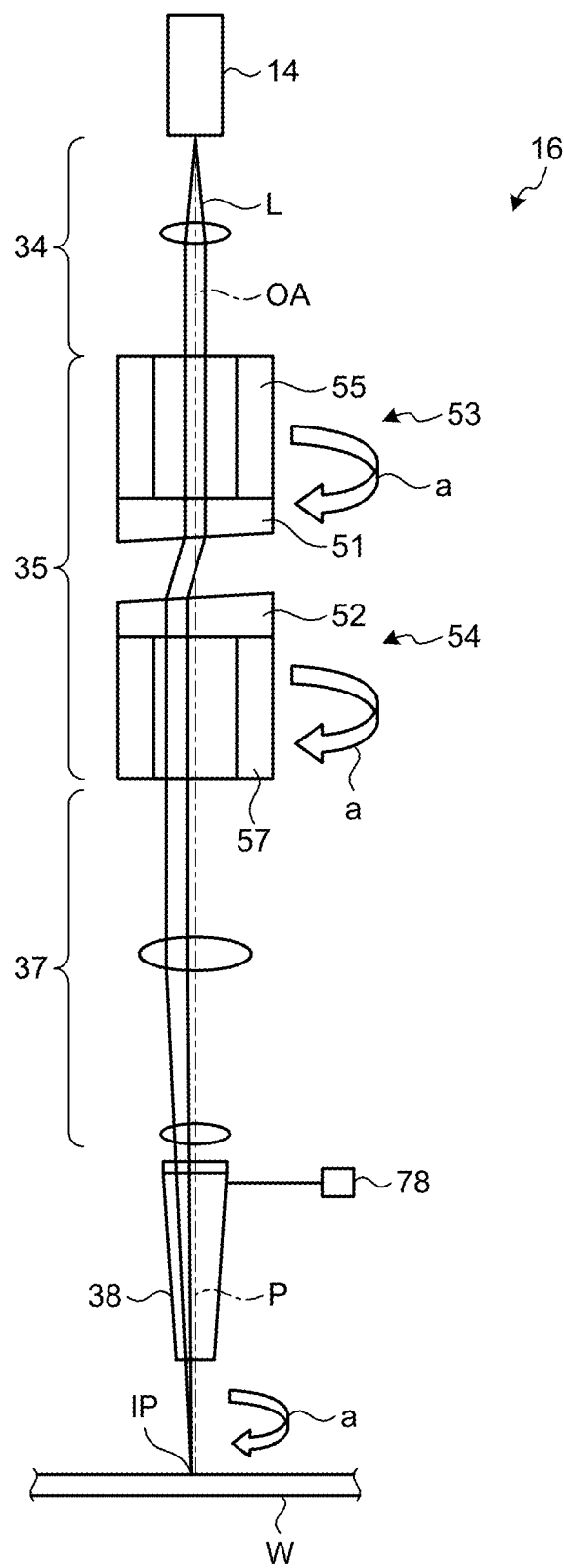
FIG. 20 is an explanatory diagram of a schematic structure of an irradiation head according to a second embodiment.

Next, an irradiation head 16 according to a second embodiment will be described. FIG. 20 is an explanatory diagram of a schematic structure of the irradiation head according to the second embodiment. A basic structure of the irradiation head 16 according to the second embodiment is similar to the irradiation head 16 of the processing apparatus 10 according to the first embodiment. Therefore, the description on the same parts is omitted. In the irradiation head 16 according to the second embodiment, a collimate optical system 34, a laser turning unit 35, and a condensing optical system 37 are integrally coupled with each other as the light paths of the lasers L of them are linearly (coaxially) arranged.

As illustrated in FIG. 20, the irradiation head 16 includes the collimate optical system 34, the laser turning unit 35, the condensing optical system 37, and a nozzle 38. In the irradiation head 16, the collimate optical system 34, the laser turning unit 35, the condensing optical system 37, and the nozzle 38 are arranged in this order in the light path of the laser L output from a guiding optical system 14 from the upstream side to the downstream side. The irradiation head 16 irradiates a workpiece W which is arranged at a position opposite to the nozzle 38 with the laser L output from the guiding optical system 14.

The laser turning unit 35 includes a hollow cylindrical first spindle 55 which is rotationally driven by a first rotating mechanism 53 and supports a first prism 51 and a hollow cylindrical second spindle 57 which is rotationally driven by a second rotating mechanism 54 and supports a second prism 52. Accordingly, the irradiation head 16 turns the irradiation positions IP of the laser L emitted to the workpiece W by rotating the laser L around the center P of the light path.

Also, the irradiation head 16 can change a turning radius R, a turning speed, and a track TR of the laser L emitted to the workpiece W according to the processing mode and the like by controlling the rotation speed of the first rotating mechanism 53, the rotation speed of the second rotating mechanism 54, and the difference in the phase angle between the first prism 51 and the second prism 52.

EXPERIMENTAL EXAMPLE

Figure 21:
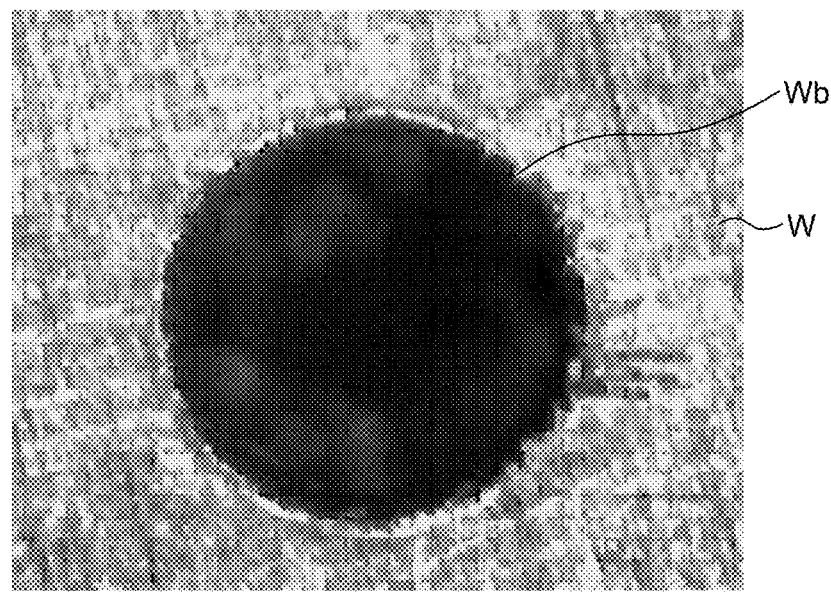
FIG. 21 is a diagram of exemplary processing to the workpiece by the processing apparatus.
Figure 22:
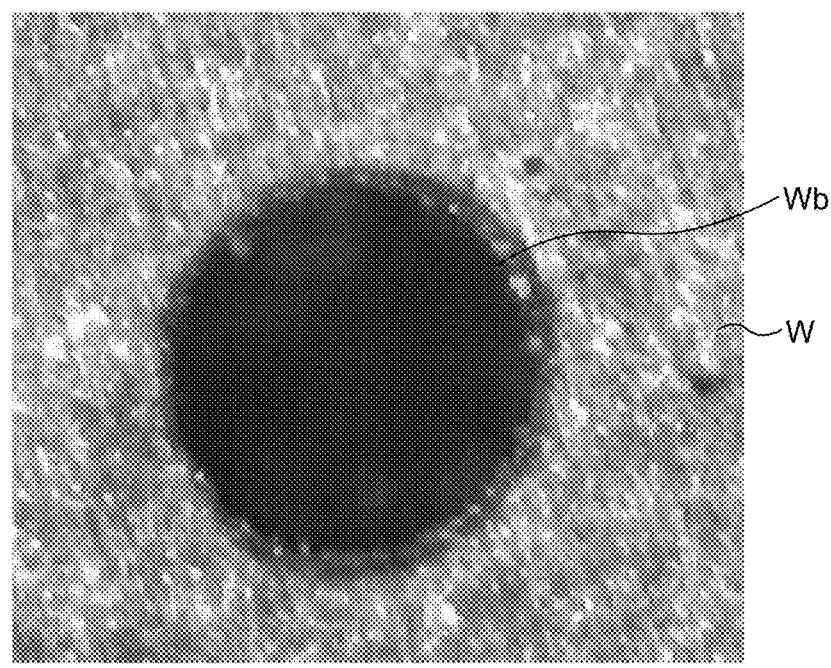
FIG. 22 is a diagram of the workpiece illustrated in FIG. 21 viewed from an opposite side.

Here, an experimental example of processing performed to the workpiece W by using the processing apparatus 10 will be described. FIG. 21 is a diagram of exemplary processing of the workpiece by the processing apparatus. FIG. 22 is a diagram of the workpiece illustrated in FIG. 21 viewed from an opposite side.

The laser L emitted to the workpiece W has a laser peak power of 100 W to 20 kW, a frequency of five Hz to 10 kHz, a pulse width of 1 μs to 100 ms, an irradiation time of 10 ms to 10 S, a focal point distance of 40 to 400 mm, and a turning speed of 20 to 5000 rpm. As assist gas, oxygen having a pressure of 0.1 to one MPa is used. However, air and nitrogen may be used, and rare gas such as argon gas (Ar) and xenon gas (Xe) may be used. Also, the Inconel (registered trademark) with the thickness of 0.5 to 10 mm is used as the workpiece W.

The result of the processing performed by the processing apparatus 10 under the above-mentioned condition is illustrated in FIGS. 21 and 22. Here, the surface (incident side of laser) of the workpiece W is illustrated in FIG. 21, and a rear surface of the workpiece W is illustrated in FIG. 22. As illustrated in FIGS. 21 and 22, a bore Wb is formed in the workpiece W in this experimental example. It has been found that the processing apparatus 10 can accurately perform the processing with few distortion and unevenness around the bore Wb by performing the processing under the above-mentioned condition even when the irradiation time of the laser is 0.2 S.

As described above, the processing apparatus 10 according to the embodiments can change the turning radius R of the laser L emitted to the workpiece W by changing the difference between the phase angles of the first prism 51 and the second prism 52. Therefore, the processing apparatus 10, that is, a laser processing apparatus can be a simple and compact structure. Also, the processing can be performed by using the turning radius R which is more suitable for the processing mode and the processing condition by controlling the difference between the phase angles of the first prism 51 and the second prism 52 and changing the turning radius R of the laser L emitted to the workpiece W. Accordingly, the required processing quality can be satisfied, and the processing with higher accuracy can be performed at a high speed.

Also, since the processing apparatus 10 according to the embodiments separately controls the first prism 51 and the second prism 52, the processing apparatus 10 can set the turning radius R of the laser L emitted to the workpiece W to an arbitrary turning radius R. That is, the processing apparatus 10 can irradiate the workpiece W with the laser L which is suitable for the kind of the processing (processing mode).

Also, the processing apparatus 10 according to the embodiments can control the thickness TH of the heat affected layer Wa to be the allowable thickness by controlling the rotation speeds of the first prism 51 and the second prism 52 by the control device 30. Therefore, the processing apparatus 10 can control the heat affected layer Wa of the workpiece W. Accordingly, the processing apparatus 10 can perform the processing to the workpiece W with high accuracy.

In the above-mentioned embodiments, the processing apparatus 10 uses the fiber laser outputting device and the short pulse laser outputting device. However, the laser is not limited to this, and it is preferable to use a laser output device for outputting the laser L which can perform the processing relative to the workpiece W. Accordingly, the processing apparatus 10 can use various laser output devices and can use a suitable laser output device according to a processing application.

Also, the fiber laser outputting device may be a laser output device using either one of a continuous wave oscillation (continuous wave operation) or a pulse oscillation (pulsed operation). In a case of the continuous wave oscillation, since the fiber laser outputting device easily obtains a high output, the fiber laser outputting device can be suitably used for the cutting processing and the welding. In a case of the pulse oscillation, since the fiber laser outputting device easily reduces a thermal effect, the fiber laser outputting device can be suitably used for fine processing.

Also, regarding the fiber laser outputting device, a light intensity distribution of the cross section of the laser L emitted to the workpiece W may be a Gaussian mode (single mode) or a multimode. In a case of the Gaussian mode, since the fiber laser outputting device easily narrows the spot diameter of the irradiation position IP and easily obtains the high output, the fiber laser outputting device can be suitably used for the welding, the cutting processing, ultrafine boring processing, and the like. In a case of the multimode, since the thermal effect on a base material is easily reduced, the fiber laser outputting device can be suitably used for the surface reforming processing, the surface finishing, brazing, and the like.

Also, in the above-mentioned embodiments, the processing apparatus 10 performs the processing to the plate workpiece W. However, the shape of the workpiece W is not especially limited, and the various shapes of the workpieces W can be used. Also, the processing apparatus 10 may perform the processing relative to the workpiece W by combining the cutting processing, the boring processing, the welding, the cladding, the surface reforming processing, the surface finishing, and the laser lamination molding. Also, the processing apparatus 10 can emit the laser in the track TR having a bending point and emit the laser in the track TR having a curved shape by controlling the irradiation position IP of the laser L. Accordingly, the processing apparatus 10 can perform various processing for turning and emitting the laser L relative to the workpiece W.

Also, since the processing apparatus 10 can improve the processing accuracy, it is preferable to use a metal material such as a steel plate as the workpiece W. However, the workpiece W is not limited to this. It is preferable that the workpiece W be formed of at least any one of the following materials, i.e., Inconel (registered trademark), HASTELLOY (registered trademark), stainless, ceramic, steel, carbon steel, ceramics, silicon, titanium, tungsten, resin, plastics, fiber reinforced plastics, a composite material, and Ni based heat resistant alloy. Also, since the processing apparatus 10 can reduce and remove the thermal effect (effect of thermal damage), the processing apparatus 10 can be used to various materials and the composite material to which it is necessary to perform the processing after reducing and removing the thermal effect. Accordingly, the processing apparatus 10 can perform the processing relative to various materials.

Also, in order to move a relative position between the irradiation position IP of the laser L and the workpiece W, the processing apparatus 10 may move the workpiece W, may move the irradiation head 16, and may move both the workpiece W and the irradiation head 16. Accordingly, the processing apparatus 10 can perform the processing to the workpiece W at a high speed.

Also, in the above-mentioned embodiments, the processing apparatus 10 has been described which turns the laser L on the workpiece W and changes the turning radius R of the laser. However, when changing the turning radius R of the laser L to be emitted, the processing apparatus 10 may control the rotation speeds of the first prism 51 and the second prism 52 so that a moving speed (for example, linear speed on virtual circle IC) of the irradiation position IP of the turning laser becomes constant. Accordingly, the processing apparatus 10 can make the energy per unit time of the laser L emitted to the workpiece W at the irradiation position IP be constant.

Also, the processing apparatus 10 images a pilot hole formed in the workpiece W by the imaging unit 40, measures the bore diameter from the image data of the imaged pilot hole, estimates the thickness TH of the heat affected layer Wa from the measured bore diameter and a condition of the irradiated laser L (peak output, pulse width, turning speed, turning radius R, and the like), determines the turning speed and the turning radius R of the laser L which is the range of the allowable thickness of the heat affected layer Wa from the estimated thickness TH of the heat affected layer Wa, and controls the rotation speed of the first hollow motor 56, the rotation speed of the second hollow motor 58, and the difference in the phase angle between the first hollow motor 56 and the second hollow motor 58 by the control device 30 by using the determined turning speed and turning radius R of the laser L. In this way, the processing apparatus 10 may form a main bore. Accordingly, the processing apparatus 10 can more accurately control the thickness TH so that the thickness TH of the heat affected layer Wa of the workpiece W is kept within a range of the allowable thickness.

Also, the processing apparatus 10 may move a relative position relationship between the workpiece W and the laser L to be irradiated in five-axis directions by relatively moving the processing stage 20 and the irradiation head 16 in the five-axis directions by using the x-axis moving mechanism 22, the c-axis rotating mechanism 24, the y-axis moving mechanism 26, the z-axis moving mechanism 28, and the index mechanism 39. The five-axis directions include the x-axis direction, the y-axis direction, the z-axis direction, the c-axis direction, and a swing direction.

Also, at least one of the first hollow motor 56 and the second hollow motor 58 may be an ultrasonic motor. Accordingly, the processing apparatus 10 can easily improve a positioning accuracy of the phase angles (rotation position) of the first hollow motor 56 and the second hollow motor 58.

Also, the turning speed of the laser L emitted to the workpiece W may be increased, and the pulse width of the laser L may be shortened. Accordingly, the processing apparatus 10 can make the thickness TH of the heat affected layer Wa be thinner.

Also, the control map (scattering object control map) for determining the correlation between the amount of the scattering objects from the irradiation position IP of the laser L on the workpiece W and the turning speed of the laser L is referred, and the rotation speed of the first prism 51 the rotation speed of the second prism 52, and the difference in the phase angle between the first prism 51 and the second prism 52 are determined. Then, the first hollow motor 56 and the second hollow motor 58 may be rotated by the determined rotation speeds and the determined difference in the phase angle. Accordingly, the processing apparatus 10 can reduce the thickness TH of the heat affected layer Wa and the amount of the scattering objects.

Also, in the above-mentioned embodiments, the guiding optical system 14 is the optical fiber. However, the guiding optical system 14 is not limited to this and may combine a mirror and a lens and guide the laser L to the irradiation head 16 by reflecting or collecting the laser L. Accordingly, the irradiation head 16 can be used in various processing apparatuses.

Also, in the above-mentioned embodiments, the processing stage 20 relatively moved by the x-axis moving mechanism 22 has been described. However, the processing stage 20 may be an XY stage, an XYZ stage, or the like. Also, the irradiation head 16 may be relatively moved to three directions, i.e., x, y, and z. The irradiation head 16 may be moved in the c-direction in addition to the three-axis directions of x, y, and z by being supported by an arm. Accordingly, the processing apparatus 10 can use, for example, an existing processing apparatus.

REFERENCE SIGNS LIST

10 processing apparatus
12 laser oscillator
14 guiding optical system
16 irradiation head
16a irradiation head cover
20 processing stage
22 x-axis moving mechanism
24 c-axis rotating mechanism
26 y-axis moving mechanism
28 z-axis moving mechanism
30 control device
32 portal bridge
34 collimate optical system
35 laser turning unit
36 catoptric system
37 condensing optical system
38 nozzle
39 index mechanism
40 imaging unit
41 gap detecting unit
51 first prism
52 second prism
53 first rotating mechanism
54 second rotating mechanism
55 first spindle
56 first hollow motor
57 second spindle
58 second hollow motor
59, 60 bearing
61, 63 hollow rotor
62, 64 stator
65 encoder
66 identifier
67 detection unit 71 first reflecting mirror
72 second reflecting mirror
73 cylindrical part
74 nozzle mounting part
75 joint unit
77 light transparent member
78 assist gas supply source
81 index shaft
82 hollow motor
83 index angle detecting unit
84 bearing
85 hollow rotor
86 stator
91 welding wire
92 overlay welding material wire
a, b, d arrow
IC virtual circle
D, Da irradiation width
IP, IPa, IPb irradiation position
L laser
OA optical axis
P center
R, Ra, Rb turning radius
TH thickness
TR, TRa, TRb track
W workpiece
W1 one workpiece
W2 other workpiece
Wa heat affected layer
Wb bore
Wc welding unit
Wd overlay welding part
We surface reforming unit

The invention claimed is:

1. A processing apparatus which performs processing by irradiating a workpiece with laser, comprising:
   an irradiation head configured to irradiate the workpiece with the laser and including a laser turning unit which turns the laser relative to the workpiece and a condensing optical system which collects the laser turned by the laser turning unit; and
   a control device configured to control an operation of the irradiation head, wherein
   the laser turning unit includes a first prism which refracts the laser, a second prism which is arranged at a position opposite to the first prism and refracts the laser output from the first prism, a first rotating mechanism which rotates the first prism, and a second rotating mechanism which rotates the second prism, and
   the control device is further configured to adjust a rotation speed of the first prism, a rotation speed of the second prism, and a difference in a phase angle between the first prism and the second prism based on a relationship between at least a predetermined allowable thickness of a heat-affected layer of the workpiece and a turning speed of the laser beam emitted to the workpiece to control the first rotation mechanism an the second rotation mechanism synchronously and relatively in rotation such that a thickness of the heat affected layer irradiated by the laser beam is smaller than the predetermined allowable thickness.

2. The processing apparatus according to claim 1, wherein the first rotating mechanism includes a first spindle which holds the first prism and comprises a through hole through which the laser passes, and a first hollow motor to which the first spindle is rotatably inserted and which rotationally drives the first spindle, and
the second rotating mechanism includes a second spindle which holds the second prism and comprises a through hole through which the laser passes, and a second hollow motor to which the second spindle is rotatably inserted and which rotationally drives the second spindle.

3. The processing apparatus according to claim 2, wherein an error of a difference in the phase angle between the first hollow motor and the second hollow motors is equal to or less than 0.1°.

4. The processing apparatus according to claim 1, wherein the control device controls the first and second rotating mechanisms based on a relation between at least the predetermined allowable thickness of the heat affected layer of the workpiece, the turning speed of the laser emitted to the workpiece, and a turning radius of the laser to adjust the rotation speed of the first prism, the rotation speed of the second prism, and the difference in the phase angle between the first prism and the second prism.

5. A processing method for performing processing by irradiating a workpiece with laser, comprising:
   outputting the laser;
   determining a rotation speed of a first prism, a rotation speed of a second prism, and a difference in a phase angle between the first prism and the second prism based on a relation between at least a predetermined allowable thickness of a heat affected layer of the workpiece and a turning speed of the laser beam irradiated to the workpiece such that a thickness of the heat affected layer irradiated by the laser beam is smaller than the predetermined allowable thickness;
   rotating a first rotating mechanism and a second rotating mechanism synchronously and relatively in rotation based on the determined rotation speeds and the determined difference in the phase angle; and
   irradiating the workpiece with the laser while turning the laser.

6. The processing method according to claim 5, wherein the processing includes at least one of cutting processing, boring processing, welding, cladding, surface reforming processing, surface finishing, and laser lamination molding.

7. The processing method according to claim 5, wherein the heat affected layer includes at least one of a remelted layer, an oxide layer, a crack, and a dross.

8. The processing method according to claim 5, wherein the determination step determines the rotation speed of the first prism, the rotation speed of the second prism, and the difference in the phase angle between the first prism and the second prism based on the relation between at least the predetermined allowable thickness of the heat affected layer of the workpiece, the turning speed of the laser beam emitted to the workpiece, and a turning radius of the laser.

* * * * *